United States Patent [19]

Pardo

[11] Patent Number: 5,280,748

[45] Date of Patent: Jan. 25, 1994

[54] COOK/CHILL TANK

[75] Inventor: Richard J. Pardo, Baltimore, Md.

[73] Assignee: W. R. Grace & Co.-Conn., New York, N.Y.

[21] Appl. No.: 840,352

[22] Filed: Feb. 24, 1992

[51] Int. Cl.⁵ .............................................. A23L 3/04
[52] U.S. Cl. ...................................... 99/330; 99/355; 99/367; 99/370; 99/470; 99/517
[58] Field of Search ................ 99/330, 331, 352, 355, 99/356, 357, 359–361, 367, 370, 371, 403, 407, 448, 450, 467, 470, 472, 483, 516, 517; 165/61, 48.1; 422/300–303, 295, 297; 426/407, 412, 509, 521–524

[56]  References Cited

U.S. PATENT DOCUMENTS

| | | | |
|---|---|---|---|
| 2,082,460 | 6/1937 | Omsted ........................ | 99/370 |
| 3,215,538 | 4/1963 | Sada . | |
| 4,088,444 | 5/1978 | Byrne . | |
| 4,164,590 | 8/1979 | Mencacci . | |
| 4,346,650 | 8/1982 | Zaitsu ........................... | 99/367 |
| 4,381,443 | 4/1983 | Guibert . | |
| 4,505,192 | 5/1985 | Dréano . | |
| 4,636,395 | 1/1987 | Robinson, Jr. et al. ........ | 426/521 |
| 4,646,629 | 3/1987 | Creed et al. ................... | 99/483 |
| 4,660,468 | 4/1987 | Goldhahn ...................... | 99/516 |
| 4,666,722 | 5/1987 | Creed et al. ................... | 426/524 |
| 4,702,161 | 10/1987 | Andersen ....................... | 99/483 |
| 4,704,958 | 11/1987 | Braymand ...................... | 422/302 |
| 4,739,699 | 4/1988 | Nelson et al. .................. | 99/359 |
| 4,752,490 | 6/1988 | Dréano . | |
| 4,773,321 | 9/1988 | Wijts .............................. | 99/361 |
| 4,784,053 | 11/1988 | Barnhart . | |
| 4,830,278 | 5/1989 | Kohmura et al. . | |
| 5,005,471 | 4/1991 | Dréano . | |
| 5,097,759 | 3/1992 | Vilgrain et al. ................ | 99/330 |

FOREIGN PATENT DOCUMENTS

| | | |
|---|---|---|
| 9004928 | 5/1990 | European Pat. Off. . |
| 3604808 | 8/1987 | Fed. Rep. of Germany ........ 99/470 |

*Primary Examiner*—Timothy F. Simone
*Attorney, Agent, or Firm*—Edward J. Cabic

[57]  ABSTRACT

An apparatus for uniformly cooking foods which rapidly cools the cooked foods to reduce spoilage. Food packages are placed on trays and the trays are inserted in a transportable rack. The rack is loaded into a cooking tank. A pump continuously circulates hot water through a conduit from a heat exchanger to the tank to cook the food and returns the water back to the heat exchanger. A control mechanism determines and controls the temperature of the water and monitors the temperature of the food to control the length of time the heated water is applied. After the food has been properly cooked and pasteurized, cold water is rapidly supplied to the tank to quickly cool the cooked products. The continuous circulation of water during the heating mode provides uniform cooking with precise temperature control and the circulation during the cooling mode provides for rapid cooling so as to reduce spoilage.

24 Claims, 5 Drawing Sheets

COOK/CHILL TANK

BACKGROUND OF THE INVENTION

1. Field of the Invention

This invention relates to an automatic heating and cooling tank system for heating and cooling food.

2. Description of the Previously Published Art

Food products have been sterilized by heating them with steam in hermetically sealed containers. The high temperatures of the sterilization kill bacteria, but these same high temperatures also have an adverse effect on the food quality. The food, in effect, becomes "overcooked". Examples of these sterilization devices are disclosed in several U.S. Patents.

U.S. Pat. No. 3,215,538 relates to the sterilization of food products packaged in hermetically sealed containers. Fluid heat radiant means are used in an autoclave to balance the pressure increase within the containers.

U.S. Pat. No. 4,088,444 relates to the application of a fluid medium to food containers in a tank. A closed loop recirculating fluid system is used. The containers are prevented from becoming immersed within the bath formed in the tank.

U.S. Pat. No. 4,164,590. A plurality of spaced food containers are submitted to heat exchange by means of introduction of the spaced containers into a tank adapted with inlet and outlet means for a heat exchange fluid passing through said tank. The tank is maintained at higher than ambient pressure. The containers may be pouches (col. 3, line 62).

U.S. Pat. No. 4,784,053 relates to a food product cooker having compartments through which steam is introduced and withdrawn. A constant and uniform heating temperature is maintained.

U.S. Pat. No. 4,830,278 relates to an apparatus for steam sterilization of edible material containing pouches. In column 1 provision is made to apply a uniform temperature distribution. A predetermined pressure is maintained at all times.

Food products have also been cooked in a container where hot and cold water are supplied from storage tanks.

U.S. Pat. No. 4,505,192 relates to a cooker in which a number of cooking tanks are connected to central hot and cold water storage tanks and a piping and control system is provided such that the hot or cold water is repetitively fed and drained from the cooking tanks during the cooking process in a cyclic fashion. When hams are cooked in moulds they are contacted with heat carrying fluid for a relatively short period of time, then the fluid is removed for a relatively long period of time. This cycle is reproduced a certain number of times until the desired temperature is attained at the heart of the product.

U.S. Pat. No. 5,005,471 relates cooker in which central hot and cold water storage tanks are disposed above a plurality of cooking tanks and are connected to the cooking tanks by a complex system of headers, pipes and valves.

Other devices for heating food include heated air as disclosed in U.S. Pat. No. 4,381,443 where packages containing precooked food are reheated in a rack over which heated air is passed.

In U.S. Pat. No. 4,752,490 food, such as hams, is conveyed through a heating unit where heated water in a basin is raised up to immerse the hams and cook them for a period of time. Then the hams move through a series of heating zones with each maintained at different temperatures where they are further heated in warm air.

In World Patent Publication 90/04928 a heating device moves the food along a conveyer and heated water is sprayed on one side.

3. Context of the Invention

The present invention relates to a process and an apparatus for the batch cooking of packaged foods to pasteurization temperatures, followed by rapid cooling to $+38°$ F. min., thus providing refrigerated products with an extended shelf life suitable for shipment, rethermalization, and consumption.

The overall process is known as sous vide—French for "under vacuum" meaning the products are packaged prior to cooking using a Form-Fill-Seal (FFS) machine. This machine utilizes roll stock to produce pouches of a seven layer structure with ethylene vinyl alcohol (EVOH) making up the barrier layer. Pouch package sizes range from about 2 oz. to 10 lbs. net weight. After forming, the pouch is filled with product and advances to the next sequence where it is vacuumized, heat sealed, and each individual pouch is cut-out and trimmed to size. Vacuumizing eliminates oxygen, which has a detrimental effect on food product quality and reduces a product's shelf life.

Organoleptic considerations and sensory perceptions of taste, texture, aroma, and mouthfeel all require the products to be pasteurized, but not overcooked. Thus temperature sensing, control, and recording are critical in the process. Both the cooking temperature and time will vary depending on the product(s) as diverse as a 6 oz. chicken breast to an 8 lb. pouch of beef stroganoff. Thus there is a correlation in the environmental (process) water temperature with respect to the final internal (core) food temperature and the total heating/cooling curve.

It is of paramount importance to maintain a complete and unbroken record, through the thermal process, of both time and temperature. This begins with the ambient temperature of the food product, through the pasteurizing cooking cycle, and finally through the quick cooling cycle. After the food has been cooked it is necessary to prevent and reduce any chance of bacteria propagation by quickly reducing the temperature of the cooked food product to at least $38°$ F. and preferably lower. This quick cooling is done prior to removal of the product from the cook/cool tank and into the final refrigerated storage. The cooling sequence is an integral step following the cooking/pasteurizing cycle as it stops the cooking process, prevents over processing, and restricts bacterial growth. Once the product has been heated to the proper internal temperature, and for the required time period, it is important to minimize any opportunity for the growth of micro-organisms in the $+120°$ F. to $+60°$ F. range. Thus, quick cooling of the product down to refrigeration temperature of $35°$–$40°$ F. results in restriction of microbial growth and prevents autolytic changes in the product.

Other methods of processing usually require moving the product from one container to another such as from an oven to a cold box. However, in that prior art method the recording of both time and temperature cannot be continuously maintained.

4. Objects of the Invention

It is the object of this invention to automatically cook food in packages, using heated water, so as to reach the pasteurization temperature at the core of the food without overheating or overcooking.

It is a further object of this invention to provide a water heated cook tank which maintains a uniform temperature in the tank within 0.2° C.

It is a further object of this invention to start the cooling sequence immediately following the cooking-/pasteurizing cycle as the cooling stops the cooking process, prevents overprocessing, and restricts bacterial growth.

It is a further object of this invention to cook and rapidly cool the cooked product while the food product remains in the same container.

It is a further object of this invention to maintain a complete and unbroken record through the thermal heating and cooling process of both the time and temperature so as to insure that complete cooking has taken place and the cooking cycle has been successful.

It is a further object of this invention to process various sizes of vacuumized and sealed pouches containing food product servings from several ounces to about 8.5 to 10 pounds.

It is a further object of this invention to utilize only "3A-dairy" type sanitary fittings and components allowing quick and manual disassembly for cleaning without requiring tools.

It is a further object of this invention to provide a pouch/package transport and holding system which protects and isolates each pouch or package while allowing full exposure of each to the process water.

It is a further object of this invention to use custom made thermocouple probes and a self sealing membrane as a means of monitoring the food core temperature.

It is a further object of this invention to provide a micro-processor to control all of the mechanical and electrical functions required in the thermal processes.

It is a further object of this invention to provide a temperature and time control utilizing a software program (F-Value), which determines a predictable means of bacterial destruction.

It is a further object of this invention to use an integrated food thermal processing apparatus and method which retains the organoleptic properties of the food an extends the refrigerated shelf life of the food.

These and further objects of the invention will become apparent as the description of the invention proceeds.

SUMMARY OF THE INVENTION

The invention relates to an automatic heating apparatus for uniformly cooking foods with the provision for subsequent rapid cooling of the cooked foods to reduce spoilage of the final refrigerated products. By cooking the food in this manner the shelf life of the cooked food is increased. The apparatus comprises a tank for heating and cooling the food in food packages. Inside the tank are transportable racks having trays on which the food packages are placed prior to loading into the tank. The trays hold the food packages in a separated, spaced-apart condition so the heating fluid can evenly contact each of the packages. The packages are heated by hot water which is supplied to the tank from a heat exchanger. The water circulates through a conduit from the heat exchanger to the tank and returns from the tank to the heat exchanger. A pump in the conduit provides for the continuous circulation. The water is either in a heated or cooled condition depending on whether the heat exchanger is in a heating mode for cooking or a cooling mode for after cooking. The apparatus has a control mechanism to determine and control the temperature of the water and the length of time the heated water is applied to the tank to cook the food in the tank to the desired extent. When the cooking is completed, cold water is supplied to the tank from a utility water supply and from the heat exchanger in the cooling mode to quickly cool the cooked products. The continuous circulation of water during the heating mode provides uniform cooking with precise temperature control and the circulation during the cooling mode provides for rapid cooling so as to reduce spoilage.

DESCRIPTION OF THE PREFERRED EMBODIMENTS

To properly cook/cool the product(s) and pasteurize without overcooking, a mechanical-electronic technique and system have been developed utilizing:

A custom heat/chill tank complete with circulation system, heat exchange system, distribution system and flow controls. All meeting current U.S.D.A. requirements for sanitation.

Pouch holding trays and transport racks.

Programmable micro-processor which monitors the various thermal cycles, cycle timing requirements, operates various media valves, and permits both automatic and manual operation of the complete system.

Temperature controller/recorder using custom thermocouple to sense the process water and product temperatures.

Figure 1:
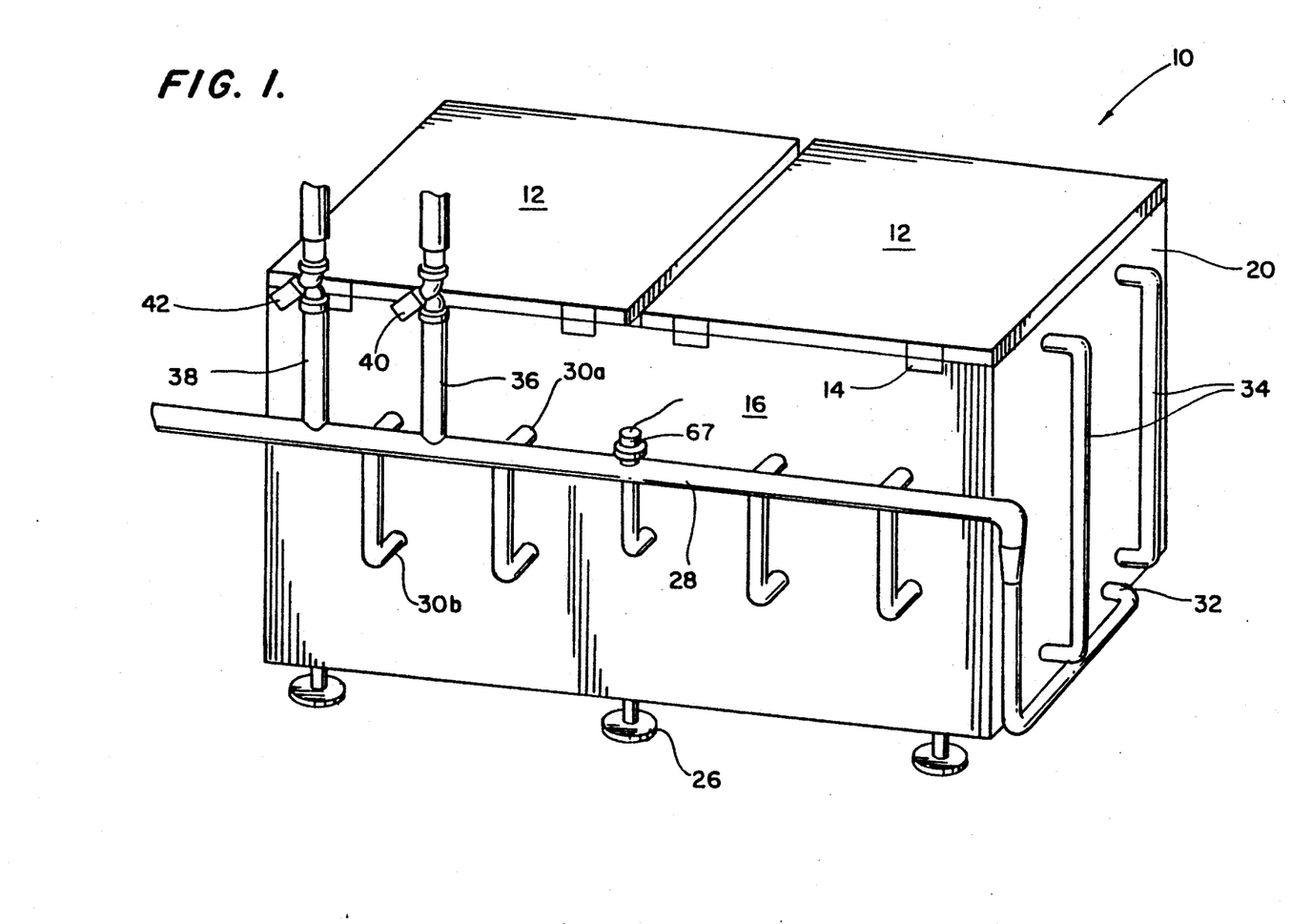
FIG. 1 is a perspective view of the cooking tank illustrating the front end and rear side wall of the tank.

The custom heat/chill tank embodiment is illustrated in FIG. 1 in a preferred embodiment of the invention with a heat/chill tank 10 having a top 12 in the form of two separate covers connected to the rear side wall 16 by hinges 14.

These top covers are preferably removable and insulated and have a quick release pin for each of the two hinges per cover to remove each cover. The tank has a rectangular configuration with side walls which are longer than the end walls. The longer side walls are rear side wall 16 and an opposite front side wall 18 which is not shown in the figure. Front end wall 20 and rear end wall 22, which also is not shown in the figure, rest on the bottom 24 which is supported off of the ground by legs 26.

The tank is preferably constructed of stainless steel and it is rectangular in configuration. The tank preferably has 2 inches of insulation on all tank surfaces including the two separate and removable insulated top covers and an outer stainless steel sheath or jacket. The stainless steel sheath or cover on the outer surface of the insulation aids in cleaning and sanitizing. The tank is off the floor for cleaning and supported by self leveling legs and floor flanges. A preferred distance from the floor is about 9 inches. The inside bottom of the tank is sloped to the drain for full drainage. There are several special construction features which provide uniform thermal distribution and flow control throughout the tank to eliminate "dead spots" in the water bath and to make a consistent and uniform environment for processing the food products.

The vertical corners of the tank use a generous 6 inch radius as well as the horizontal corners formed by the bottom and all four sides. The junction of the four corners formed by the bottom and the four sides are spheroidal in shape, eliminating the usual 90° corners, and providing a smooth concave surface when viewed from inside the tank. The distribution piping connections in the side of the tank are for lateral flow of the water from the orifices, through the trays and transport racks, and over to the far side of the tank. These connections provide a "push" motion for the water. There are also two connections located at the bottom rear of the tank, and these in conjunction with the pump suction connection located tangentially in the front corner of the tank opposite the side connection, provide the "pull" of water flow along the tank's longitudinal axis. This flow is facilitated by maintaining about 3 inches clear under the racks.

Validation testing (as required by U.S. Department of Agriculture) has shown this arrangement to be within 0.2° C. temperature difference between the desired set point and the temperature within the actual working area of the tank. In this preferred large size tank it generally takes about 15 minutes for the tank to reach equilibrium at all points relative to the hot water set point and this is taken into account as part of the control functions.

A water supply distribution manifold 28 is positioned adjacent the rear side wall 16 and it continues around to the front end by bending down and along the front end wall 20. Connecting the water supply distribution line to the inside of the tank are a series of upper feed lines 30a and lower feed lines 30b which are sanitary clamped to other sanitary fittings which are welded into the side of the tank to form supply jets inside the tank. At the front end of the tank are the two front end feed lines 32 which supply water from the distribution manifold 28 to the bottom of the front end of the tank. To protect these front end feed lines from being damaged by food transportation racks which will be positioned next to this front end when they are loaded into the tank, bumpers 34 in the form of U-shaped pipes can be attached to the front end wall 20 so the vertical pipes extend out from the end wall a distance greater than either of the front end feed lines 32 or the water supply line 28.

Cold water is supplied to the water supply distribution line 28 by cold water supply line 36 and hot water is supplied by hot water supply line 38. Each line has a control valve which opens and closes the supply line. The cold water supply valve is 40 and the hot water supply valve is 42. These control valves are operated automatically by the central controller.

Figure 2:
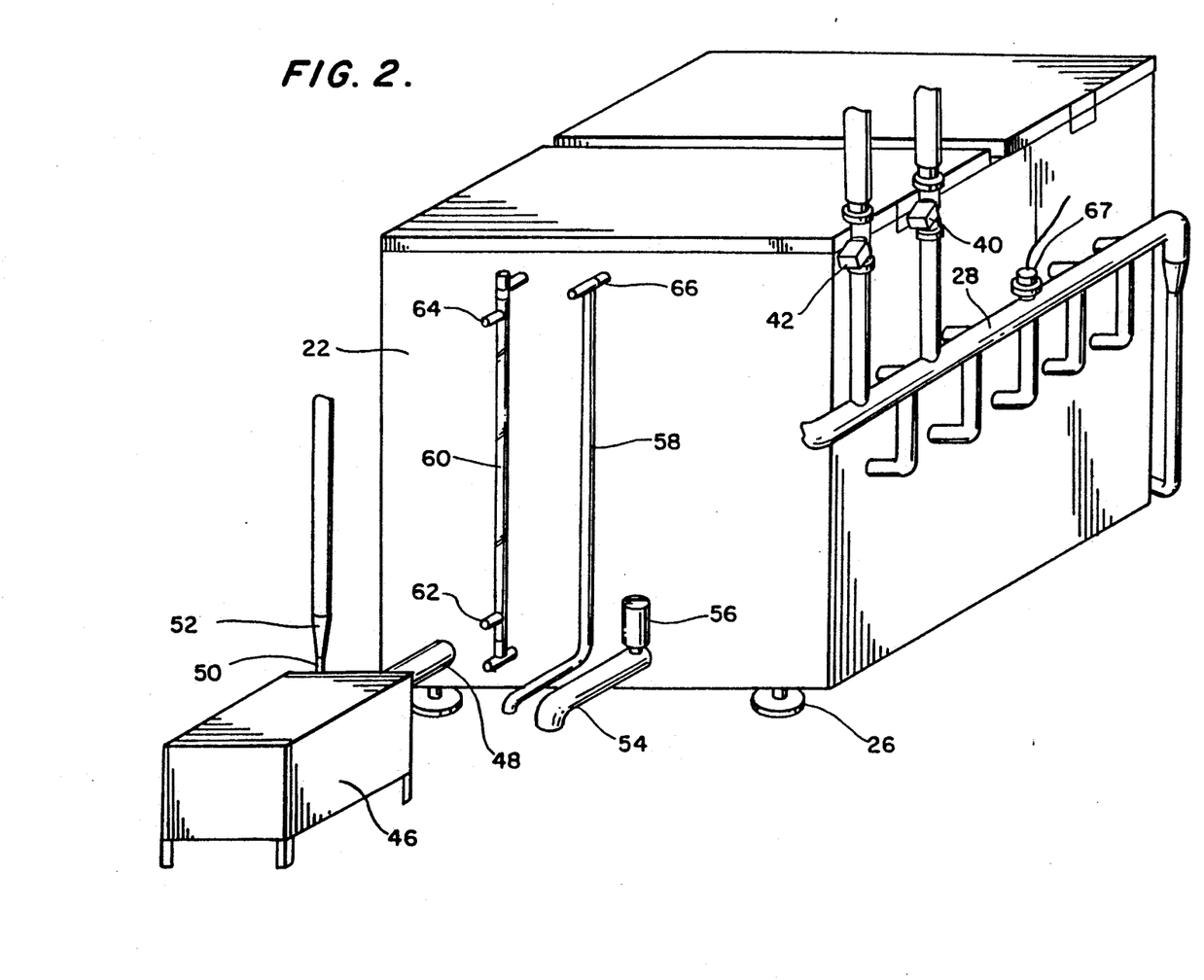
FIG. 2 is a perspective view of the cooking tank illustrating the rear end wall and rear side wall of the tank.

To maintain the water temperature uniformly throughout the tank, the water is continuously circulated. FIG. 2 illustrates the rear end of the tank where centrifugal pump 46 withdraws the water via suction line 48 from the bottom of the tank. As a pump safeguard feature, it is desirable to not start the pump until the level in the tank has reached a minimum level.

Process water temperature is monitored by a thermocouple 67 located on the center of manifold 28. The thermocouple 67 is connected to a temperature controller/recorder which maintains the desired set point. The water leaving the pump flows out line 50 to a heat exchanger 70 shown in FIG. 3 where the process water can either be further heated with steam or cooled with ice water before the circulating water is returned to the tank via the water supply distribution line 28. The heat exchanger 70 is preferably a plate and frame heat exchanger which has a steam inlet line 72 with a major 2 inch conventional solenoid valve 74 and a ¾ inch modulating steam valve 76. The condensed steam exits out line 78. The other side of the heat exchanger has an ice water line 80 with solenoid control valve 82 and the ice water leaves the heat exchanger through line 84. The heat exchanger preferably has two different plate circuits with separate steam plates and separate ice water plates. The process water is always in motion through the plate path. The line 50 to the heat exchanger has an in-line strainer 52 to protect the heat exchanger from food particles in case a pouch should break.

Drain line 54 attached to the bottom of the tank drains the water from the tank and control valve 56 is used to open and close the drain. In the event the water level becomes too high, an overflow drain line 58 is connected near the top of the tank and it outlets to the drain in the floor.

The water level is monitored to determine when it reaches a minimum level (for turning on or off the pump) and to determine when the water level has reached its desired maximum level (so that no additional water is added). External glass sight tube 60 is connected to the bottom of the tank and extends up to the top of the tank where the top is open to the atmosphere. Positioned along this tube are a low water level sensor 62 and a high water level sensor or proximity switch 64. When the water reaches these sensors signals are sent to the central controller where the appropriate action can be taken. For example, the height of the water can be maintained at a desired level in the tank to make up for any operational level losses.

To prevent pressurizing the system during operation a vent is used which maintains atmospheric pressure without pressurizing the system. The sight glass gauge has a fixed removable cover plate at the top of the sight glass gauge with a small diameter open hole which forms the vent. This vent continuously vents the tank when the covers are closed.

The temperature inside of the product being cooked can be measured by a thermocouple 66 which can be inserted into a package of food being processed in the tank. The opening in the tank provided by the overflow drain line serves as a convenient location to run the thermocouple wire 66 from outside the tank into the tank.

Figure 4:
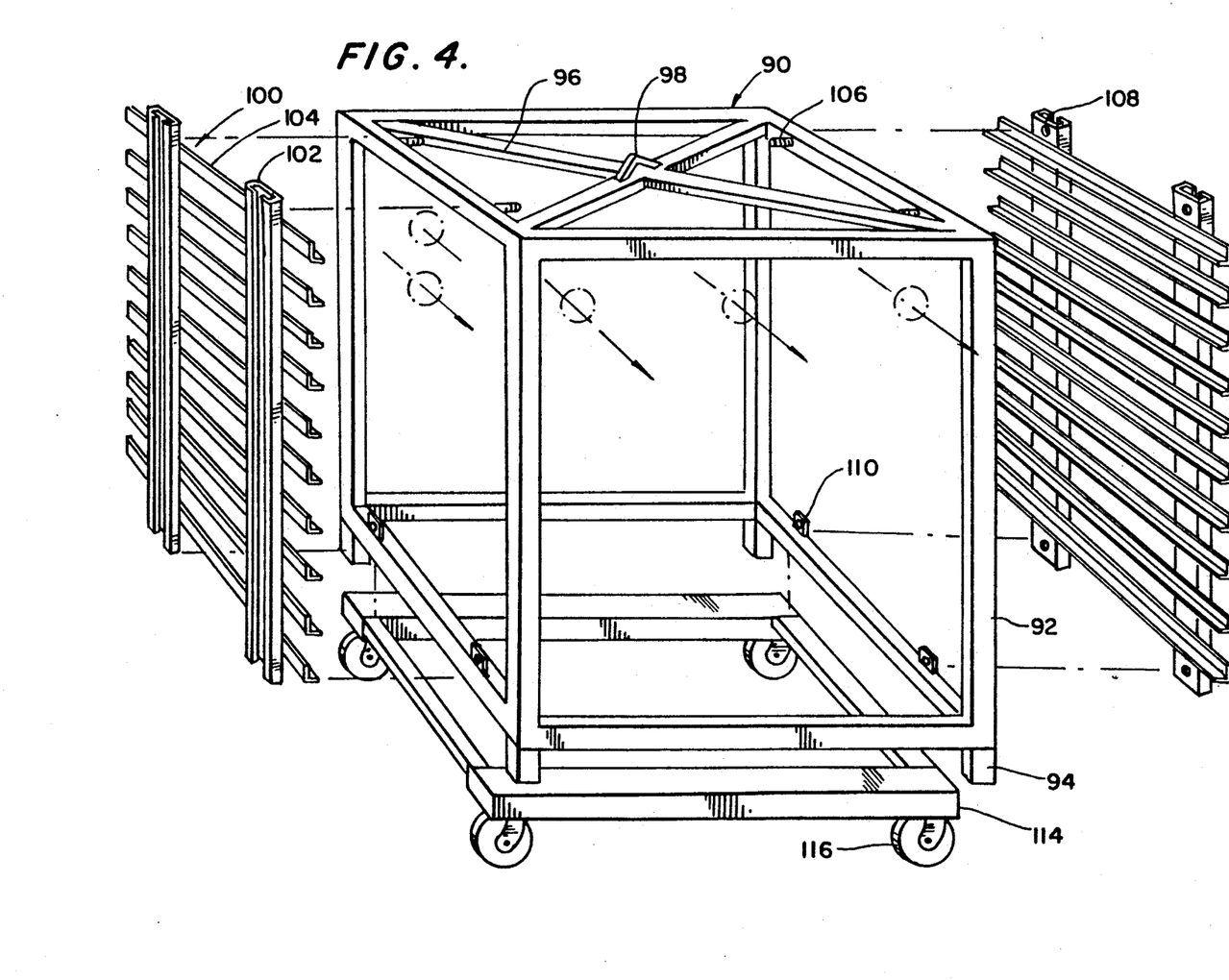
FIG. 4 is a perspective view of the transport rack.

The transport rack 90 is illustrated in FIG. 4 and is made of a rectangular main support frame 92 with legs 94 to maintain the rack off of the floor of the tank. The top of the frame can have reinforcing members 96 which cross in the middle where a lifting eye 98 is located for hoisting the rack into the tank. The sides of the rack have detachable tray support assemblies 100 made up of two formed channels 102 onto which are attached a variable number of formed angles 104. When cooking small packages of food having single portion sizes, there can be many trays spaced relatively close together. On the other hand, when cooking large 8 pound casings or packages of bulk food, then the detachable tray assembly will have fewer number of formed angles which will be spaced apart a greater distance. These adjustable shelves can be set to maintain a preferred water path of not less than about ¾ inch between product layers on the wire trays. The tank is preferably a rectangular size that can hold one or more, preferably two, of these rack assemblies made up of the trays and transport rack.

The operator can have stored various size pairs of these detachable assemblies which will have varying numbers of shelves. Each pair is inserted within the frame and attached to the frame with any type of fastening means such as the bolts 106 shown on the top frame members 92 which extend through openings 108 in the channels 102. The bottom end of the channels can be bolted to tabs 110 attached to the bottom of the frame 92.

FIG. 4 also illustrates the caster mounted transport dolly 114 having the caster wheels 116. The rack can be transported on this dolly to and from the tank and at the tank a power chain hoist is connected to the lifting eye 98 to raise the rack up and into the tank.

FIG. 4 further shows in phantom the orientation of the rack to the jet orifices from feed lines 30a and 30b in the tank. The flow of water out of these jets is parallel to the formed channels holding the trays so the channels do not get in the way of the water flowing into the tank. This configuration orients the trays and rack in relation to the water distribution orifices for maximum flow.

Figure 5:
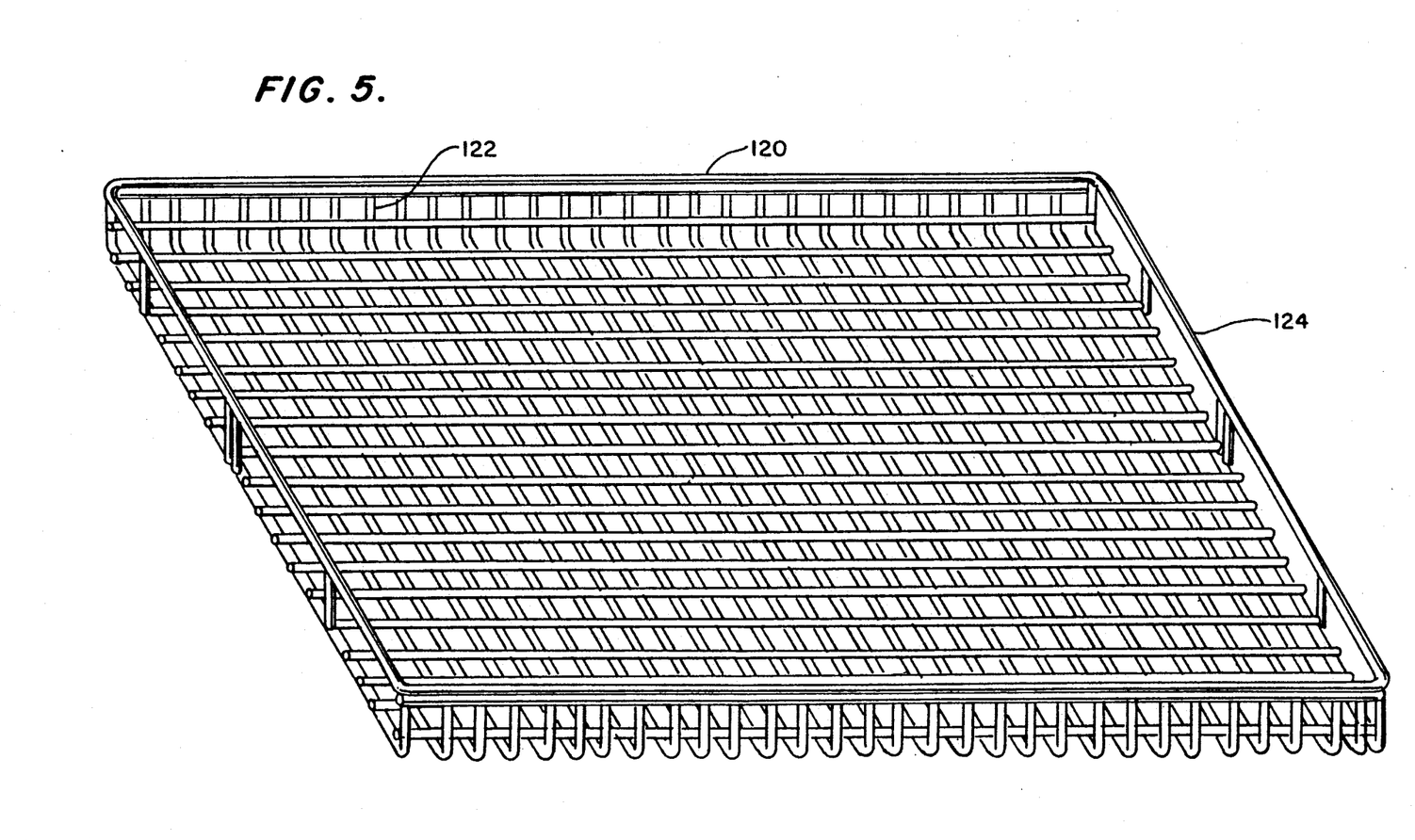
FIG. 5 is a perspective view of the wire tray which slides into the transport rack.

FIG. 5 illustrates the product holding tray 120 made of metal wires 122 of #8 gauge wire to support a 75 pound load. The wires are in a crisscross arrangement to provide large open areas for the water to circulate around the packages which are placed on the trays. The wire trays are adapted to hold various size pouches in the tank with minimum surface contact and to allow maximum water contact on all surfaces.

The upper wire 124 is added as additional support and it serves as a stiffener rim and lift handle. Whenever a wire crosses or touches another wire it is welded for strength, ground smooth and electropolished to protect the casings, pouches and packages from being cut and thus contaminating the product inside.

Since the apparatus will be used in a food environment it is necessary to have completely sanitary operations for all the valves, fittings, gauges, pump connections, distribution piping and heat exchanger connections. In this regard use is made of "3A-dairy" type quick clamp disconnects for complete breakdown, inspection and cleaning without using pipe thread connections.

Operation of the Device and Process Methodology

Raw food products which are to be thermal processed by our "Fresh Chill" method are carefully screened and monitored in a critical path quality assurance process. Only natural and wholesome products without extenders or additives are used in the preparation area. This same standard also applies to items supplied by vendors. The necessary seasonings are incorporated at the product assembly station. All this is done within an environmentally controlled area which is maintained at 40°-45° F. All raw and cooked foods are completely segregated to prevent cross contamination due to raw meats, poultry, fish, etc. which may be in process.

Packaging is done in a more stringent work space which will require the employees to gown with clean clothes, face mask, hair net, exam gloves, and shoe covers. Again, the environmental necessity of 40°-45° F. temperature is maintained. A filtered air supply and restricted access through a double door (air lock) arrangement is used to keep the work space under higher positive pressure. The pouch is preferably made of a composite multilayer structure with ethylene vinyl alcohol, EVOH, as a barrier layer. Such a material has a low gas permeability.

A horizontal form-fill-seal machine pre-forms a pouch of proper size in relation to the food product such as a $4 \times 5 \times \frac{1}{2}$ inch deep pouch for a 6 ounce chicken breast or a $10 \times 16 \times 2.5$ inch deep pouch for a large 8.5 pound serving of beef taco filling. Preferred pouch sizes are those which contain individual food product servings in the range of about 4 to 6 ounces and those production packages having a capacity of about 8.5 to 10 pounds. After the food product is deposited into the pouch, it advances to the next sequence where it is vacuumized, heat sealed, and cut to final trim size.

Cooking to pasteurization is done in the special cook/cool tank as described previously. The pouches are placed on stainless steel trays of #8 wire gauge with overlapping wire rods spot welded together on 1 inch centerlines. The pouches are placed on the trays in a random manner which allows for a maximum loading since each pouch has a margin of ½ inch where the EVOH film was previously sealed. The overlapping pouches with their extending seal edges permit maximum loading in a nonstacking manner so that all the surfaces of each pouch are exposed to the circulating water. If desired, additional holder means could be used to stack the packages in some array. Since a full vacuum is used, the only air remaining in the pouch package is that small residual amount trapped inside the food product. This is sufficient for all pouches, except the smallest of 3 to 4 oz. size, to keep the packages at a negative buoyancy so they remain where they were placed and do not float in the cook tank. The smallest sizes can move due to water currents and this can be prevented by using other wire tray devices to hold and separate each of the small pouches. A six-sided rectangular transport rack holds these loaded wire trays by means of adjustable support angles. This permits maximum loads at all times by compensating for the variation in pouch thickness while allowing for sufficient clearance between, around, over, and under each pouch regardless of pouch size.

The transport rack, when loaded, is rolled on a removable wheeled dolly to the cook/cool tank at the front end of the tank adjacent to bumpers 34 where it is hoisted up and into the tank. About halfway into the tank each of the two transport racks is stopped in position where the operator will select a previously prepared pouch and insert a custom hypodermic needle thermocouple. The needle is inserted directly into the food product by means of a closed cell insulating pad which is self-sealing and which is adhesively attached to the pouch. This provides a leak proof seal when the probe is inserted and removed from the pouch.

Since it is the product internal (core) temperature which determines when the cooking process is done, a thermocouple is used which is sensitive and reproducible to temperature changes as small as 0.1° C. or less. These readings are monitored on digital readouts and recorded on a chart. The chart and digital readout are calibrated to read to within the same span of 0.1° C. Thus, the inserted thermocouples in each rack are connected directly to a temperature controller/recorder and readouts are adjustable to various time increments with a 30 second increment normally being employed.

After the thermocouple is inserted, the transport rack is then lowered into the tank. The top lid of the tank over that rack is closed and the automatic controller is started. Initially hot water is supplied by opening valve 42 which permits the hot water to flow through hot water supply line 38 into the water supply distribution line 28. A centrifugal pump is positioned between the tank and heat exchanger and is started and stopped by the lower of two proximity switches (i.e. 62) mounted to the sight glass column 60. The other proximity switch 64 controls the high water level.

Figure 3:
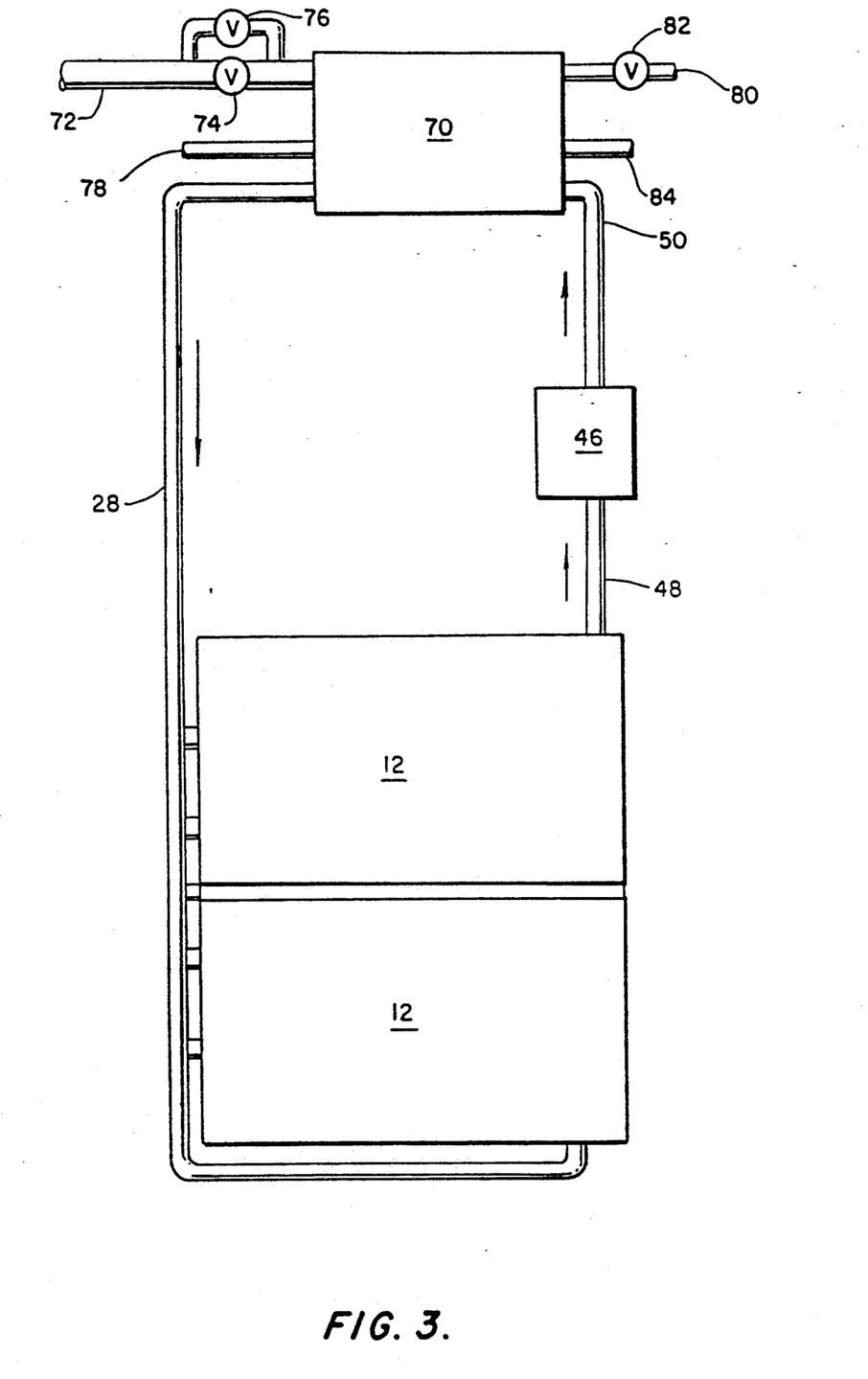
FIG. 3 is a top view of the cooking tank and the associated heat exchanger.

Once the water fill sequence is initiated, and the water level reaches the lower proximity switch 62, the pump starts and stays running. The pump continues running unless the water level drops below the lower proximity set point which stops the pump. The flow path is out of the tank bottom to the pump suction connection 48, through the pump 46 and through the heat exchanger 70, and finally back into the tank distribution manifold 28 and into the tank. There is no control valve in the water flow path. The flow is always in motion through the heat exchanger.

This hotter water, under pressure from the centrifugal pump, flows back through the water supply distribution line 28 and into the tank through the upper and lower feed lines 30a and 30b and the front end feed lines 32. Because the hot water is entering the tank under pressure, it jets into the tank and mixes with the water already in the tank to ensure uniform mixing of all of the water in the tank. Also because there are many jets in the tank arranged at more than one level, the jets break up any stratification of different levels of water which would have different temperatures.

After the water level reaches the level of the high water level sensor 64, a signal is sent by the central controller to close the valve 42 on the hot water supply 38. The water level remains constant and the water in the tank continues to recirculate to the heat exchanger where it continues to be heated until the desired water temperature is reached.

The food product is cooked by the water circulating through the heat exchanger until the required pasteurization temperature and time has been reached.

The heat exchanger 70 is preferably a plate and frame heat exchanger which uses a specific set of plates for heating by steam, and another specific set of plates for cooling by utility cold water and ice water. All of the control valves for water, steam, and ice water service are pneumatically activated and spring loaded to close for fail safe operation.

For the ice water cooling a single pneumatic/solenoid valve 82 is used for on and off only control. For the rapid and controlled heating two valves are used. A major 2 inch valve 74 and a ¾ inch modulating valve 76 are both opened at start up. Upon a 15° C. approach to the desired set point temperature, the major valve closes and remains closed. The ¾ inch modulating valve receives its signal directly from Honeywell temperature controller. It is tuned to the controller so it can close down to zero flow and it is used to control within an extreme accuracy of 0.2° C. This achieves a maximum difference of 0.5° C. between the set point and readout.

After the cooking is done the cooked food is quickly cooled so as to prevent overcooking, to restrict microbial growth, to prevent autolytic changes in the food product, and to provide for longer shelf life at refrigerated temperatures in the range of 38° F. to 32° F. because the longer shelf life is due to the greater bacterial destruction in cooking and the restriction of bacterial growth during cooling and refrigerated storage.

All of the cook/cool control functions are sequenced through the integration of the programmable microprocessor and Honeywell temperature control/recorder. This control system provides for cooking in at least three modes.

Mode 1:

Cook to Time. This is useful for certain products not under U.S.D.A. inspection.

Mode 2:

Cook to Internal Temperature by Set Point Control. This is useful for large muscle products such as turkey breast, pork loin and top round beef roasts. A probe is inserted through the casing and into the product. Cooking is stopped when the set point is reached and then the cooling cycle begins.

Mode 3:

Cook to Internal Core Temperature Using F-Value. This method is required to process sous vide products to their proper pasteurization temperatures and time periods.

In 1923, C. O. Ball introduced the symbol F to designate the equivalent in minutes at 121.1° C. (250° F.) of the combined lethalities of all time-temperature relationships at the point of slowest heating of a product during heat processing. Thus, the F-value is a measure of the killing power of a heat process and provides a predictable means of bacterial destruction. The D-Value is the time required to reduce a microbial population by one decimal or by one log. The Z-Value is obtained when D is plotted against temperature, the number of degrees (in °C. or °F.) to traverse a log cycle is defined as the slope Z. The Z value is thus a measure of the relative heat sensitivity of a particular organism. See Chapter 2 in "Processing and Packaging of Heat Preserved Foods", edited by J. A. G. Rees et al, Van Nostrand Reinhold (1991).

To manually calculate the necessary F value (while maintaining a cooking schedule that is not deleterious to the food product quality) it is necessary to use a general formula and apply it to various food products requiring different temperatures and times.

The general formula is:

Lethality Value or F Value = the number of equivalent minutes at a given reference temperature and Z-value.

T = Reference Temperature (°F.) (which Ball selects as 250° F.)

T = Temperature (°F.)

Z = Z-Value (°F.)

t = Time (minutes)

$$A = \frac{T - Tr}{Z}$$

Lethal Rate = $10^A$

Lethality (Min.) = Lethal Rate × Time Fi = 1/Lethal Rate

In actual practice, a software program can be used which is a part of the Honeywell controller/recorder and all of the calculations are done instrumentally. It is necessary for the operator to manually enter into the key pad of the Honeywell controller/recorder the F-Value and Z-Value as required by the specific food products.

When cooking, it is preferred to provide greater food safety by using F-Values high enough to provide D-Values on the order of many types of heat resistant bacterial spores which are disease causing. For example, cooking can be done with a reference temperature of not less than 82.2° C. (180° F.) and a Z-Value of 10 to provide the additional margin of safety.

After the food has been adequately cooked, the system is designed to reduce the temperature as quickly as possible. One procedure to do that is to first drain the tank down about ⅔ of the capacity so it is at the level of ⅓ of the tank by opening valve 56 on drain line 54. Then the valve 40 on the cold water line 36 is opened to add in the cold water which is at city cold water temperature (about 55° F.). The tank is refilled by this cold water. Then the water is drained again down to the same low level and a second refill is done with cold tap water. This water is then drained a third time to the ⅓ tank level and a third refill is done while the ice water valve 82 is opened at the heat exchanger to further cool the circulating water as it flows through the heat exchanger. Finally the fill water supply is turned off when it reaches the upper fill level and the water continues to circulate until the product reaches the desired chill temperature. The cooling water in this last step is cooled to a temperature in the range of about 38° F. to 32° F. The water can be drained prior to removal of the food packages by draining the water out line 54.

The top is opened, the thermocouple is removed from the food package and the overhead hoist is connected to the transport rack to raise the transport rack up out of the tank and over to the front end of the tank where it is lowered onto the cart for removal of the cooked and chilled food to a cold storage room.

After multiple runs, the tank is cleaned and sanitized. This is done every 24 hours and preferably every 12 hours.

It is understood that the foregoing detailed description is given merely by way of illustration and that many variations may be made therein without departing from the spirit of this invention.

What is claimed is:

1. An automatic heating and subsequent cooling apparatus for uniformly cooking foods and reducing spoilage of the refrigerated products which increases the shelf life of the cooked food, comprising:
   a tank for heating or cooling food packages to be placed in the tank;
   rack means to hold the food packages in a separated condition when placed in the tank;
   means to supply water to the tank having a plurality of water distribution orifices in the tank arranged at more than one level to break up any stratification of different levels of water having different temperatures so as to provide a substantially constant temperature throughout the tank;
   a heat exchanger;
   conduit means connecting the tank and the heat exchanger to circulate water form the tank to the heat exchanger and to return water from the heat exchanger to the tank;
   pump means in said conduit means to continuously circulate water between the tank and the heat exchanger and back to the tank;
   control means to determine and control the temperature of the water and the time heated water is applied to the tank to cook the food in the tank to the desired extent, and
   means to quickly cool the cooked products to reduce spoilage.

2. An apparatus according to claim 1, further comprising means to provide a substantially constant temperature throughout the tank and to all of the food products.

3. An apparatus according to claim 2, wherein the interior corners of the tank are rounded, and all four vertical corners are radiuses at the junction of the bottom and four sides.

4. An apparatus according to claim 1, further comprising means for keeping water flow path in continuous motion inside the tank comprising generous radius corners on the order of 6 inches at all four vertical corners and at the junction of all four vertical sides and tank bottom with all four bottom corners and being spheroidal in shape, whereby the usual 90° corners are eliminated and a smooth concave surface is provided at all right angle planes when viewed from inside the tank to eliminate dead spots in the water bath.

5. An apparatus according to claim 1, wherein the control means further comprises means to determine the temperature in the food product.

6. An apparatus according to claim 5, wherein the control means to determine the temperature in the food product comprises a hypodermic needle thermocouple in the tank for insertion into the food being cooked, and adapted to pass through a self-sealing adhesively attached pad on the food package to prevent leakage including during its withdrawal after processing.

7. An apparatus according to claim 1, further comprising means for transporting the packaged food in and out of the tank.

8. An apparatus according to claim 2, wherein the rack means is adapted to hold various size pouches in the tank with minimum surface contact and to allow maximum water contact on all surfaces.

9. An apparatus according to claim 8, wherein the rack means comprises a mobile transport rack, wire trays, means for securing the wire trays into the transport rack and adjusting means to maintain a preferred water path of not less than about ¾ inch between product layers on the wire trays.

10. An apparatus according to claim 9, where there is sufficient clearance under the rack to provide full water flow along the longitudinal axis of the tank.

11. An apparatus according to claim 9, further comprising means for orienting the trays and rack in relation to water distribution orifices for maximum flow.

12. An apparatus according to claim 11, wherein water is supplied to the tank by
   water distribution orifices through one side of the tank which provide a push motion for the water in a lateral flow through the trays and transport racks and over to the far side of the tank; and
   means for directing a pull of water flow along the bottom of the tank through
   a) water supply connections at the bottom rear of tank, and
   b) the pump suction connection located in the front end of the tank.

13. An apparatus according to claim 9, wherein said trays and transport rack means of one or more rack assemblies.

14. An apparatus according to claim 1, wherein the heat exchanger is a plate and frame heat exchanger with heating provided by a conventional solenoid steam valve and modulating steam valve and with cooling provided by a solenoid valve supplying ice water.

15. An apparatus according to claim 14, wherein the changer comprises two different plate circuits comprising separate steam plates and ice water plates and wherein the process water is always in motion through the plate path.

16. An apparatus according to claim 1, further comprising a top for the tank.

17. An apparatus according to claim 16, wherein the tank top comprises two removable, hinged insulated covers.

18. An apparatus according to claim 17, further comprising a quick release pin for each of two hinges per cover to remove each cover.

19. An apparatus according to claim 1, further comprising level control means to maintain the height level of the water at a desired level in the tank.

20. An apparatus according to claim 19, wherein the level control means comprises a high water proximity switch mounted to an external sight glass gauge and a micro-processor controller which maintains the water level at the same high level setting to make up for any operational level losses.

21. An apparatus according to claim 16, further comprising vent means to prevent pressurizing the system during operation.

22. An apparatus according to claim 21, wherein the vent means maintains atmospheric pressure without pressurizing the system and comprises a sight glass gauge and a fixed removable cover plate at the top of the sight glass gauge having a small diameter open hole for continuous venting of the tank when the covers are closed.

23. An apparatus according to claim 1, further comprising means for maintaining uniform internal water temperatures for both heating and cooling which comprises insulation on all tank surfaces, including covers, and a stainless steel sheath or cover on the outer surface of the insulation for the purpose of cleaning and sanitizing.

24. An apparatus according to claim 1, further comprising means for completely sanitary operations for all valves, fittings, gauges, pump connections, distribution piping and heat exchanger connections using "3A-dairy" type quick clamp disconnects for complete breakdown, inspection and cleaning without using pipe thread connections.

* * * * *